(12) United States Patent
Maji et al.

(10) Patent No.: US 10,310,883 B2
(45) Date of Patent: Jun. 4, 2019

(54) INTEGRATED CONFIGURATION ENGINE FOR INTERFERENCE MITIGATION IN CLOUD COMPUTING

(71) Applicant: Purdue Research Foundation, West Lafayette, IN (US)

(72) Inventors: Amiya Kumar Maji, West Lafayette, IN (US); Subrata Mitra, West Lafayette, IN (US); Saurabh Bagchi, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 155 days.

(21) Appl. No.: 15/203,733

(22) Filed: Jul. 6, 2016

(65) Prior Publication Data
US 2017/0010911 A1    Jan. 12, 2017

Related U.S. Application Data

(60) Provisional application No. 62/188,957, filed on Jul. 6, 2015.

(51) Int. Cl.
*G06F 9/455*    (2018.01)
*G06F 9/50*    (2006.01)

(52) U.S. Cl.
CPC ........ *G06F 9/45558* (2013.01); *G06F 9/5083* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,849,891 B1* | 9/2014 | Suchter | G06F 9/5038 709/202 |
| 2007/0271560 A1* | 11/2007 | Wahlert | G06F 8/61 718/1 |
| 2010/0223364 A1* | 9/2010 | Wei | H04L 29/04 709/220 |

(Continued)

OTHER PUBLICATIONS

Tickoo et al., Modeling Virtual Machine Performance: Challenges and Approaches, Intel Corp, Jan. 21, 2010, 5 pages.*

(Continued)

*Primary Examiner* — Diem K Cao
(74) *Attorney, Agent, or Firm* — Purdue Research Foundation (57) ABSTRACT

A cloud computing system which is configured to monitor operating status of a plurality of virtual computing machines running on a physical computing machine, wherein said monitoring includes monitoring a cycles per instruction (CPI) parameter and a cache miss rate (CMR) parameter of at least one of the plurality of virtual computing machines. The system detects interference in the operation of the at least one virtual machine, with the detection including determining when at least one of the CPI and CMR values exceed a predetermined threshold. When interference is detected, the system reconfigures a load balancing module associated with the virtual machine in question to send fewer requests to the virtual machine.

10 Claims, 4 Drawing Sheets

(56) References Cited

U.S. PATENT DOCUMENTS

| | | | | |
|---|---|---|---|---|
| 2010/0274890 A1* | 10/2010 | Patel | ............... | G06F 9/4862 709/224 |
| 2014/0245298 A1* | 8/2014 | Zhou | ............... | G06F 9/455 718/1 |
| 2015/0234670 A1* | 8/2015 | Shimogawa | ......... | G06F 9/45533 718/1 |

OTHER PUBLICATIONS

Zang et al., CPI2: CPU performance isolation for shared compute clusters, Google Inc. ACM, 2013, pp. 379391.*

Zhang, X., "Cpi2: Cpu performance isolation for shared compute clusters," EuroSys, 2013, pp. 379-391.

Maji, A., "Mitigating interference in cloud services by middleware reconfiguration," Middleware, 2014, pp. 277-288.

Sharma, B., "Cloudpd: Problem determination and diagnosis in shared dynamic clouds," DSN, 2013, 12 pages.

Dean, J., "The tail at scale," CACM, Feb. 2013, pp. 74-80.

Delimitrou, C., "Paragon: Qos-aware scheduling for heterogeneous datacenters," ASPLOS, 2013, pp. 77-88.

Govindan, S., "Xen and co.: communication-aware cpu scheduling for consolidated xen-based hosting platforms," VEE, 2007, pp. 126-136.

Novakovic, D., "Deepdive: Transparently identifying and managing performance interference in virtualized environments," ATC, 2013, pp. 219-230.

Rameshan, N., "Stay-away, protecting sensitive applications from performance in-terference," Middleware, 2014, pp. 301-312.

Zhang, W., "Linux virtual server for scalable network services," Ottawa Linux Symposium, 2000, 10 pages.

Finamore, A., "Youtube everywhere: Impact of device and infrastructure synergies on user experience," IMC, 2011, pp. 345-360.

Stockhammer, T., "Dynamic adaptive streaming over http—: Standards and design principles," MMSys, 2011, pp. 133-143.

Mok, R., "Qdash: A qoe-aware dash system," MMSys, 2012, pp. 11-22.

Raha, A., "Vidalizer: An energy efficient video streamer," IEEE WCNC, 2015, pp. 2233-2238.

Varadarajan, V., "Resource-freeing attacks: improve your cloud performance (at your neighbor's expense)," in CCS, 2012, pp. 281-292.

Verma, A., "pmapper: Power and migration cost aware application placement in virtualized systems," Middleware, 2008, pp. 243-264.

Koller, R., "Wattapp: An application aware power meter for shared data centers," ICAC, 2010, pp. 31-40.

Barker, S., "Empirical evaluation of latency-sensitive application performance in the cloud," MMSys, 2010, pp. 35-46.

Gupta, D., "En-forcing performance isolation across virtual machines in xen," Middleware, 2006, pp. 342-362.

Shieh, A., "Sharing the data center network" NSDI, 2011, 14 pages.

Nathuji, R., "Q-clouds: Man-aging performance interference effects for qos-aware clouds," EuroSys, 201, pp. 237-250.

Verma, A., "Cosmig: Mod-eling the impact of reconfiguration in a cloud." MASCOTS, 2011, pp. 3-11.

Liu, X., "Online response time optimization of apache web server," IWQoS, 2003, pp. 461-478.

Diao, Y., "Using mimo feedback control to enforce policies for inter-related metrics with application to the apache web server," NOMS, 2002, 16 pages.

Zheng, W., "Automatic configuration of internet services," EuroSys, 2007, pp. 219-229.

Xi, B., "A smart hill-climbing algorithm for application server configuration," WWW, 2004, pp. 287-296.

Wang., L., "Application-aware cross-layer virtual machine resource management," ICAC, 2012, 10 pages.

Bu, X., "Coordinated self-configuration of virtual machines and appliances using a model-free learn-ing approach," IEEE Transactions on Parallel and Distributed Systems, 2013, pp. 681-690.

\* cited by examiner

INTEGRATED CONFIGURATION ENGINE FOR INTERFERENCE MITIGATION IN CLOUD COMPUTING

CROSS-REFERENCE TO RELATED APPLICATIONS

The present patent application is related to and claims the priority benefit of U.S. Provisional Patent Application Ser. No. 62/188,957, filed Jul. 6, 2015, the contents of which is hereby incorporated by reference in its entirety into the present disclosure.

STATEMENT REGARDING GOVERNMENT FUNDING

This invention was made with government support under CNS 1405906 awarded by the National Science Foundation. The government has certain rights in the invention.

TECHNICAL FIELD

The present application relates to cloud computing, and more specifically to interference mitigation in cloud computing hardware and data processing.

BACKGROUND

Performance issues in web service applications are notoriously hard to detect and debug. In many cases, these performance issues arise due to incorrect configurations or incorrect programs. Web servers running in virtualized environments also suffer from issues that are specific to cloud, such as, interference, or incorrect resource provisioning. Among these, performance interference and its more visible counterpart performance variability cause significant concerns among IT administrators. Interference also poses a significant threat to the usability of Internet-enabled devices that rely on hard latency bounds on server response (imagine the suspense if Siri took minutes to answer your questions!). Existing research shows that interference is a frequent occurrence in large scale data centers. Therefore, web services hosted in the cloud must be aware of such issues and adapt when needed.

Interference happens because of sharing of low level hardware resources such as cache, memory bandwidth, network etc. Partitioning these resources is practically infeasible without incurring high degrees of overhead (in terms of compute, memory, or even reduced utilization). Existing solutions primarily try to solve the problem from the point of view of a cloud operator. The core techniques used by these solutions include a combination of one or more of the following: a) Scheduling, b) Live migration, c) Resource containment. Research on novel scheduling policies look at the problem at two abstraction levels. Cluster schedulers (consolidation managers) try to optimally place VMs on physical machines such that there is minimal resource contention among VMs on the same physical machine. Novel hypervisor schedulers try to schedule VM threads so that only non-contending threads run in parallel. Live migration involves moving a VM from a busy physical machine to a free machine when interference is detected. Resource containment is generally applicable to containers such as LXC, where the CPU cycles allocated to batch jobs is reduced during interference. Note that all these approaches require access to the hypervisor (or kernel in case of LXC), which is beyond the scope of a cloud consumer. Therefore, improvements are needed in the field.

SUMMARY

According to one aspect, a cloud computing system comprising a computing engine configured to monitor operating status of a plurality of virtual computing machines running on a physical computing machine is provided, wherein the monitoring includes monitoring a cycles per instruction (CPI) parameter and a cache miss rate (CMR) parameter of at least one of the plurality of virtual computing machines. The computing engine detects interference in the operation of the at least one virtual machine, said detection including determining when at least one of said CPI and CMR values exceed a predetermined threshold; and reconfigures a load balancing module associated with the at least one virtual machine to send fewer requests to said one of said one of said virtual machines when said interference is detected. The reconfiguring of the load balancing module may comprise reducing a request scheduling weight associated with said virtual machine in said load balancing module. The reconfiguring of the load balancing module may also comprise determining an estimated processor utilization of a web server running on said virtual computing machine, determining a request rate for the virtual machine that will reduce the processor utilization below a utilization threshold, and reducing said request scheduling weight to achieve said request rate. The computing engine may be further configured to collect training data relating to the at least one virtual machine; and utilize said training data to determine said estimated processor utilization. The computing engine may be further configured to reconfigure a web server associated with the at least one virtual machine to improve performance of the at least one virtual machine if the interference exceeds a predetermined interference duration.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
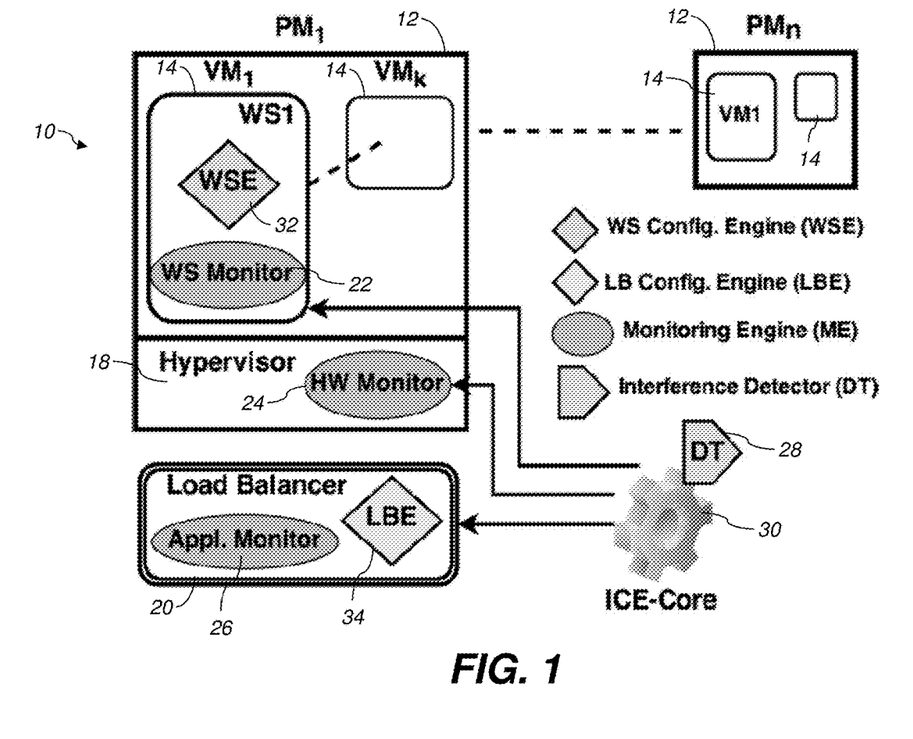
FIG. 1 is a schematic diagram of an integrated configuration engine system according to one embodiment.

In an example embodiment, a novel system and method for the management of interference induced delay in cloud computing is presented. The system may be implemented in a cloud computing environment as shown in FIG. 1, which typically includes a plurality of physical computing machines (e.g., computer servers) 12 connected together by an electronic network. The physical machines (PMs) 12 include a plurality of virtual computing machines (VMs) 14 which each run their own operating system and appear to outside clients to have their own processor, memory, and other resources, although they in fact share hardware in a physical machine 12. Each physical computing machine 12 typically has a hypervisor module 18, which routes electronic messages and other data to and from the various virtual machines 14 within a physical machine 12. Each virtual machine 14 includes one or more web server modules, which receive requests from outside client nodes and send information back to the clients as needed. Some non-limiting examples of applications for such web server software programs are website hosting, e-commerce applications, distributed computing, and data mining. A load balancer 20, which may be implemented on a separate physical computing machine or on one of the physical machines 12, may be included. The load balancer 20 is used to scale websites being hosted in the cloud computing environment to serve larger number of users by distributing load multiple physical machines 12, or multiple virtual machines 14.

As shown in FIG. 1, the present disclosure provides a system 10 which operates in a cloud computing environment and includes an integrated configuration engine (ICE) 20, an interference detector 28, a monitoring engine (ME), a load balancer configuration engine (LBE) 34, and a web server configuration engine (WSE) 32. The monitoring engine may include a web server monitor 22, a hardware monitor 24, and an application monitor 26. The system utilizes these components to monitor operating statistics, detect interference, reconfigure the load balancer if necessary, further monitors operations to determine load data, and reconfigures the web server to improve performance as shown in FIG. 3b.

The interference configuration engine 28 and interference detector 28 may comprise software modules which reside on a physical computing machine separate from the physical machines 12, or on the same physical machines 12, or distributed across multiple physical machines 12.

In one embodiment, the interference configuration engine monitors the performance metrics of WS VMs 14 at three levels of the system 10. The hardware monitor 24 collects values for cycles per instruction (CPI) and cache miss rate (CMR) for all monitored VMs 14, whereas, CPU utilization (CPU) of each VM 14 is monitored inside the VM 14 by the web server monitor 22. The application monitor 26 inside the load balancer 20 gives the average response time (RT), and requests/second (RPS) metrics for each VM 14. While the hardware counter values are primarily used for interference detection, system and application metrics are used for reconfiguration actions.

Figure 3:
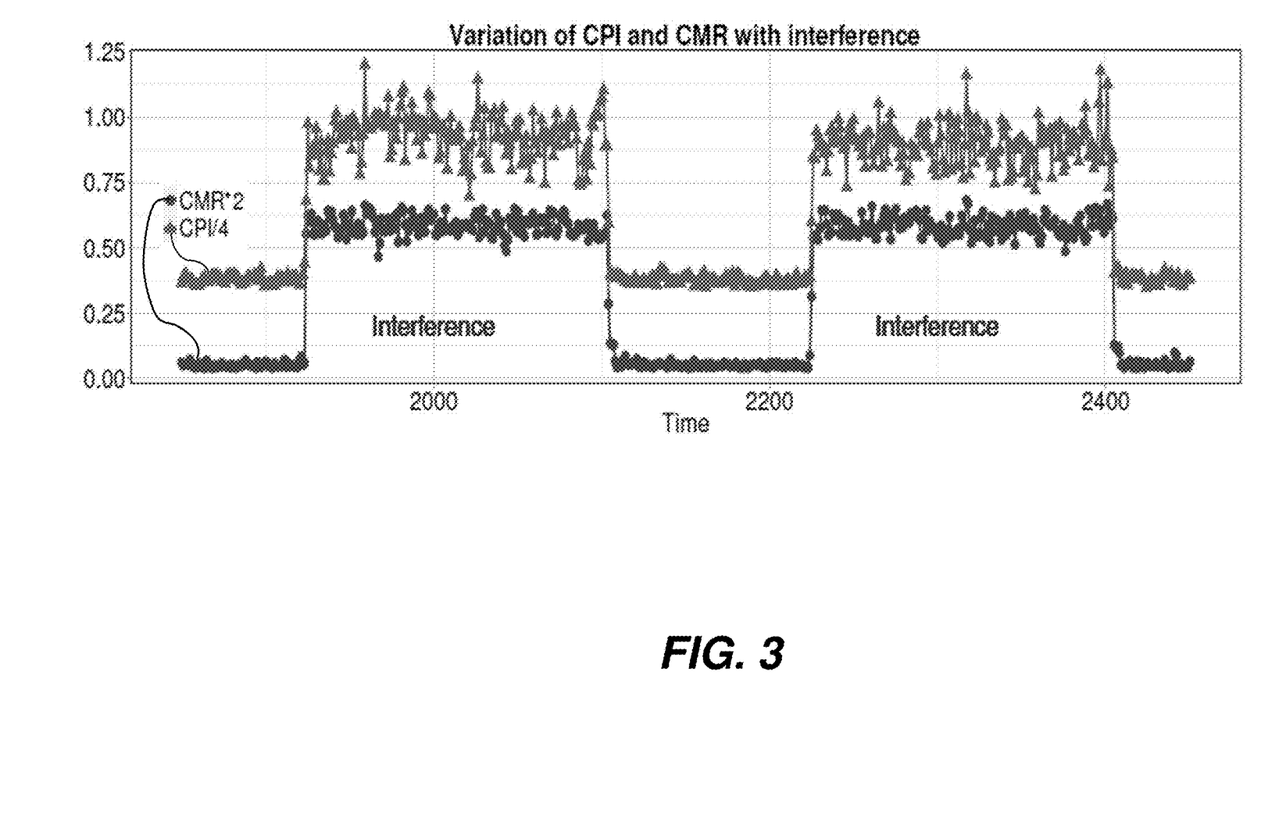
FIG. 3 is a plot illustrating variation in cycles per instruction (CPI) and cache miss rate (CMR) with interference according to one embodiment.

CPI and CMR values of affected WS VMs increase significantly during phases of interference. This is shown in FIG. 3 where the red vertical lines (start of interference) are followed by a sudden rise in CPI and CMR. Both these metrics are leading indicators of interference (as opposed to RT which is a lagging indicator) and therefore allow us to reconfigure quickly and prevent the web server from going into a death spiral (i.e., one where the performance degrades precipitously and does not recover for many subsequent requests). The ICE 30 senses the rise in CPI and CMR information to determine when interference is occurring. In certain embodiments, the ICE 30 may evaluate only CPI, only CMR, or CPI and CMR in combination to determine that interference is occurring (stage 54).

Figure 2:
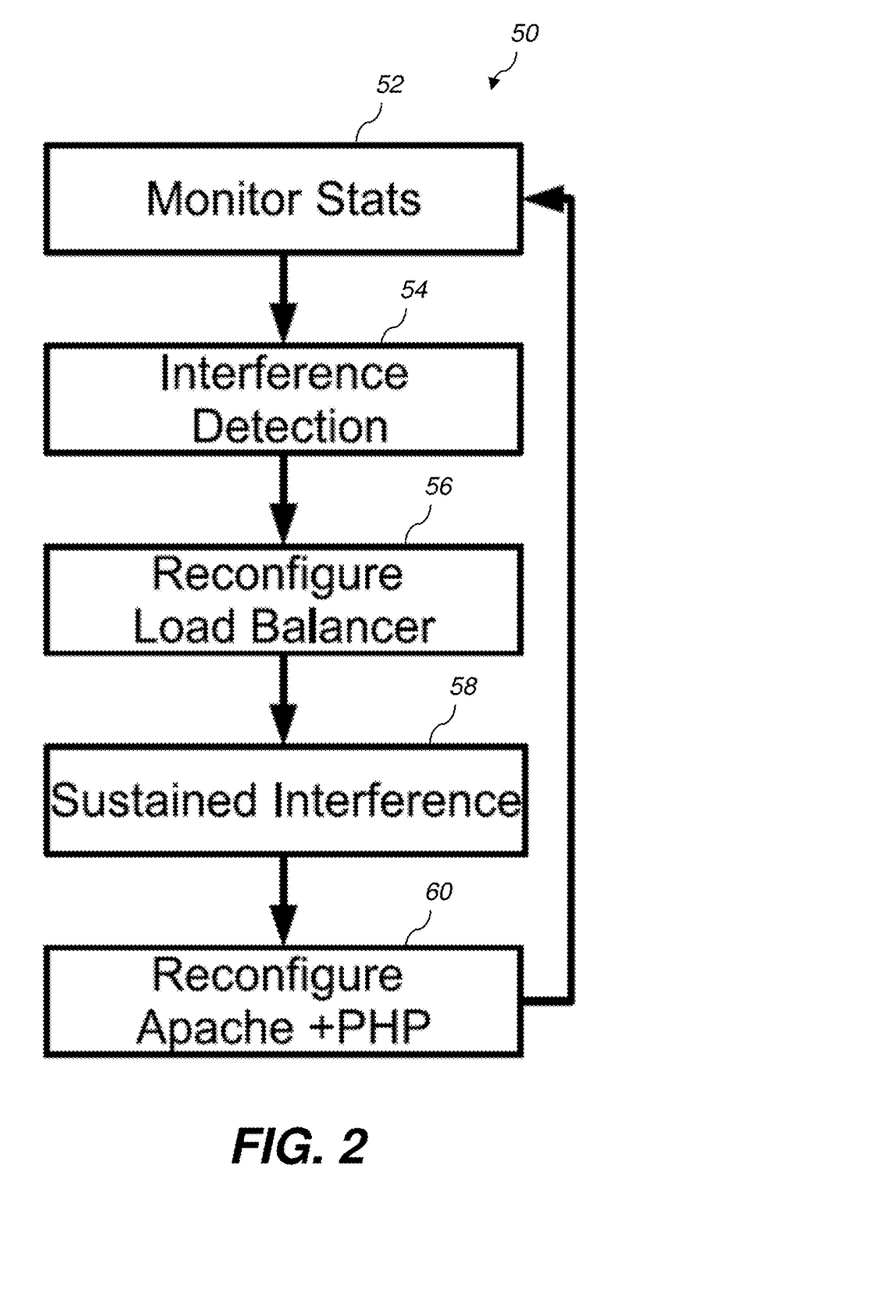
FIG. 2 is process flow diagram for the system of FIG. 3a according to one embodiment.

FIG. 2 shows a process 50 for monitoring and reconfiguring components in the system 10 in order to reduce interference and improve response time according to one embodiment. First the monitoring engine collects performance metrics from the web servers running on the virtual machines 14 using the web server monitor 22 (stage 52). The metrics are then fed as inputs to the interference detector 28 and integrated configuration engine 30, in the second stage, the interference detector analyzes observed metrics to find which WS VM(s) 14 are suffering from interference (stage 54). Once the affected VM(s) 14 are identified, the load-balancer configuration engine then reduces the load on these VMs 14 by diverting some traffic to other VMs 14 in the cluster (stage 56). If interference lasts for a long time (stage 58), the web server configuration engine 32 reconfigures the web server parameters (e.g., maximum timeout, keep al iv e time) to improve response time (RT) further (stage 60). When interference goes away the load balancer and web server configurations may be reset to their default values.

In certain embodiments, the load balancer reconfiguration (stage 56) is performed as follows: When interference is detected, a scheduling weight of the corresponding VM 14 is updated (typically lowered). A scheduling weight is a factor is assigned to the particular VM 14 as part of the algorithm performed by the load balancer 20 that assigns incoming requests or messages to a particular VM 14 among the plurality of VMs 14. By lowering the scheduling weight, a particular VM 14 will generally receive less requests. Note that, #requests forwarded to a WS is a function of its scheduling weight. Formally, $$r=(w,T),$$

where r is the requests per second (RPS) received by a WS, w is the scheduling weight, and T is total requests received at front-end (HAProxy).

Similarly, the CPU utilization (u) of a WS is a function of its load, i.e., u=g(r). The degree of interference on a WS can be approximated by its CPI measurements (c). Therefore, u=h(c). We approximate the dependence of u on r and c with the empirical function $$u=\xi(r,c)$$

During our experiments we also found that CPU utilization ut at time t is often dependent on the utilization ut−1 at time t−1. This happens because execution of a task may often last multiple intervals. For example, a request that started executing just before taking measurement for interval t may be served in interval t+1. Therefore, the measurements in intervals t and t+1 are not independent. This dependence is captured by taking into account the CPU utilization at the previous interval (we denote this as OldCPU or o) in our empirical function. The final function for estimating u is represented as $$u=\xi(o,r,c)$$

The LBE works as shown in Algorithm 1 of Table 1 below:

TABLE 1

Algorithm 1 LB reconfiguration function for ICE

1: procedure UPDATE_LB_WEIGHT( )
2:   if DT detected interference then
3:     Estimate $u^\hat{}_t \leftarrow \xi(u_{t-1}, r_t, c_t)$
4:     if $u^\hat{}_t > u_{thres}$ then
5:       Estimate $r^\hat{}_t$, s.t. $u_{thres} = \xi(u_t, r^\hat{}_t, c_t)$
6:       Compute $\delta \leftarrow (r_t - r^\hat{}_t)/r_t$
7:       Set weight $w_{new} \leftarrow (1 - \delta)w_{current}$
8:       Check Max-Min Bounds $(w_{new})$
9:     end if
10:  else
11:    Reset default weight
12:  end if
13: end procedure Assume that CPI, RPS and CPU values at time i are $c_t$, $r_t$, and $u_t$. When the DT 28 detects interference it sends a reconfiguration trigger to LBE 34. The LBE then computes the predicted CPU utilization ($u^\hat{}t$), given the current metrics $c_t$, $r_t$, and $u_{t-1}$. Notice that we use the estimated CPU $u^\hat{}_t$ to compare with setpoint $u_{thres}$ since rise in u often lags behind rise in c. If $u^\hat{}_t$ is found to exceed the setpoint, we predict a new RPS value $r^\hat{}_t$ such that the CPU utilization falls below setpoint. To predict a new load balancer weight we first compute the percentage reduction in RPS ($\delta$) that is required to achieve this. This is then used to reduce weight w proportionately. Note that during periods of heavy load, the estimated $\delta$ may be very high, practically marking the affected server offline (very low $w_{new}$). To avoid this, we limit the change in w within a maximum bound (40% of its default weight).

In certain embodiments, $\xi(\ )$ is estimated using multivariate regression on variables r, c, and o, where o is a time-shifted version of the vector u (observed CPU utilization).

In certain embodiments, the stage 56 of reconfiguring the web server parameters is achieved by adjusting the parameters of the web server. For example, the maximum number of worker threads that the web server can initiate may be lowered in times of detected interference (e.g., the MaxClients parameter in Apache web servers), and the time that client connections are persisted in an idle state before terminating (e.g., the KeepAliveTimeout parameter in Apache web servers) may be increased.

In view of the foregoing, various aspects provide a cloud computing platform with improved performance. A technical effect is to improve response times and performance in cloud computing environments.

Figure 4:
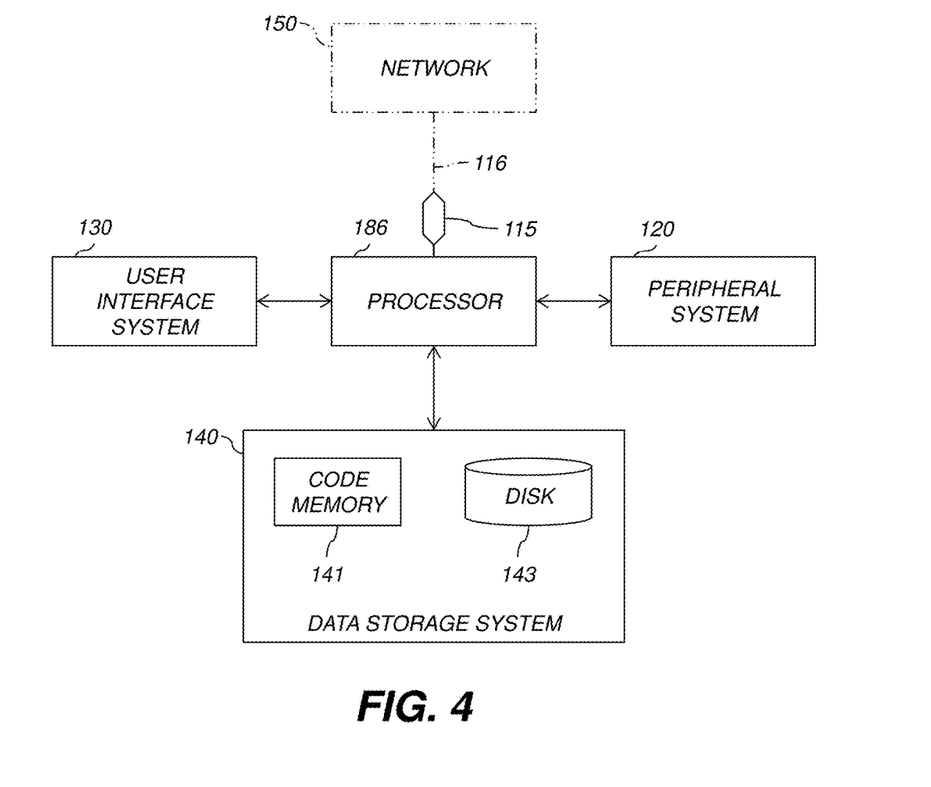
FIG. 4 is a high-level diagram showing the components of a data-processing system according to one embodiment.

It shall be understood that each of the physical machines 12, the load balancer 20, and the interference configuration engine 30 may comprise computer server components, such as those shown in FIG. 4. FIG. 4 is a high-level diagram showing the components of an exemplary data-processing system for analyzing data and performing other analyses described herein, and related components. The system, which represents any of the physical machines 12, load balancer 20, or interference engine 30, includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or a leased line, as discussed below. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). It shall be understood that the system 120 may also be implemented in a virtual machine (VM) environment, such as with the physical computing machines 12 and other components shown in FIG. 1.

Processor 186 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The peripheral system 120 can include one or more devices configured to provide digital content records to the processor 186. The processor 186, upon receipt of digital content records from a device in the peripheral system 120, can store such digital content records in the data storage system 140.

The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A cloud computing system, comprising:
   a) a computing engine configured to:
      i) monitor operating status of a plurality of virtual computing machines running on a physical computing machine, wherein said monitoring includes monitoring a cycles per instruction (CPI) parameter and a cache miss rate (CMR) parameter of at least one of the plurality of virtual computing machines;
      ii) detect interference in the operation of the at least one virtual machine, said detection including determining when at least one of said CPI and CMR values exceed a predetermined threshold;
      iii) reconfigure a load balancing module associated with the at least one virtual machine to send fewer requests to said one of said virtual machines when said interference is detected;
      iv) collect training data relating to the at least one virtual machine; and
      v) utilize said training data to determine said estimated processor utilization;
   wherein said reconfiguring the load balancing module comprises determining an estimated processor utilization of a web server running on said virtual computing machine, determining a request rate for the virtual machine that will reduce the processor utilization below a utilization threshold, and reducing said request scheduling weight to achieve said request rate.

2. The system of claim 1, wherein said reconfiguring the load balancing module comprises reducing a request scheduling weight associated with said virtual machine in said load balancing module.

3. The system of claim 1, wherein the computing engine is further configured to:
   i) reconfigure a web server associated with the at least one virtual machine to improve performance of the at least one virtual machine if the interference exceeds a predetermined interference duration.

4. The system of claim 3, wherein said reconfiguration of the web server comprises reducing a maximum clients parameter of said web server, said maximum clients parameter representing a maximum number of worker threads that the web server can initiate.

5. A cloud computing system, comprising:
   a) a computing engine configured to:
      i) monitor operating status of a plurality of virtual computing machines running on a physical computing machine, wherein said monitoring includes monitoring a cycles per instruction (CPI) parameter and a cache miss rate (CMR) parameter of at least one of the plurality of virtual computing machines;

ii) detect interference in the operation of the at least one virtual machine, said detection including determining when at least one of said CPI and CMR values exceed a predetermined threshold;

iii) reconfigure a load balancing module associated with the at least one virtual machine to send fewer requests to said one of said virtual machines when said interference is detected, and iv) reconfigure a web server associated with the at least one virtual machine to improve performance of the at least one virtual machine if the interference exceeds a predetermined interference duration, wherein said reconfiguration of the web server comprises reducing a maximum clients parameter of said web server, said maximum clients parameter representing a maximum number of worker threads that the web server can initiate;

wherein said reconfiguration further comprises increasing a keep alive timeout parameter of said web server, said keep alive timeout parameter representing a duration a client connection to the web server is persisted in an idle state before being terminated.

6. A cloud computing system, comprising:

a plurality of physical computing machines having a processor and a memory, each of the physical computing machines comprising a plurality of virtual computing machines, each of the virtual computing machines running a web server module;

a computing engine, the computing engine configured to:
monitor operating status of a plurality of virtual computing machines running on a physical computing machine, wherein said monitoring includes monitoring a cycles per instruction (CPI) parameter and a cache miss rate (CMR) parameter of at least one of the plurality of virtual computing machines;

detect interference in the operation of the at least one virtual machine, said detection including determining when at least one of said CPI and CMR values exceed a predetermined threshold; and reconfigure a load balancing module associated with the at least one virtual machine to send fewer requests to said one of said virtual machines when said interference is detected collect training data relating to the at least one virtual machine; and utilize said training data to determine said estimated processor utilization;

wherein said reconfiguring the load balancing module comprises determining an estimated processor utilization of a web server running on said virtual computing machine, determining a request rate for the virtual machine that will reduce the processor utilization below a utilization threshold, and reducing said request scheduling weight to achieve said request rate.

7. The system of claim 6, wherein said reconfiguring the load balancing module comprises reducing a request scheduling weight associated with said virtual machine in said load balancing module.

8. The system of claim 6, wherein the computing engine is further configured to:

i) reconfigure a web server associated with the at least one virtual machine to improve performance of the at least one virtual machine if the interference exceeds a predetermined interference duration.

9. The system of claim 8, wherein said reconfiguration of the web server comprises reducing a maximum clients parameter of said web server, said maximum clients parameter representing a maximum number of worker threads that the web server can initiate.

10. A cloud computing system, comprising:

a plurality of physical computing machines having a processor and a memory, each of the physical computing machines comprising a plurality of virtual computing machines, each of the virtual computing machines running a web server module;

a computing engine, the computing engine configured to:
monitor operating status of a plurality of virtual computing machines running on a physical computing machine, wherein said monitoring includes monitoring a cycles per instruction (CPI) parameter and a cache miss rate (CMR) parameter of at least one of the plurality of virtual computing machines;

detect interference in the operation of the at least one virtual machine, said detection including determining when at least one of said CPI and CMR values exceed a predetermined threshold; and reconfigure a load balancing module associated with the at least one virtual machine to send fewer requests to said one of said virtual machines when said interference is detected;

reconfigure a web server associated with the at least one virtual machine to improve performance of the at least one virtual machine if the interference exceeds a predetermined interference duration;

collect training data relating to the at least one virtual machine; and utilize said training data to determine said estimated processor utilization;

wherein said reconfiguring the load balancing module comprises determining an estimated processor utilization of a web server running on said virtual computing machine, determining a request rate for the virtual machine that will reduce the processor utilization below a utilization threshold, and reducing said request scheduling weight to achieve said request rate, wherein said reconfiguration comprises reducing a maximum clients parameter of said web server, said maximum clients parameter representing a maximum number of worker threads that the web server can initiate;

wherein said reconfiguration further comprises increasing a keep alive timeout parameter of said web server, said keep alive timeout parameter representing a duration a client connection to the web server is persisted in an idle state before being terminated.

\* \* \* \* \*